United States Patent [19]

Widener et al.

[11] Patent Number: 4,596,834

[45] Date of Patent: Jun. 24, 1986

[54] WATER RESISTANT FOAMED PRODUCT PREPARED FROM A LATEX, A MINERAL ACID, HYDRAULIC CEMENT, FILLER, AGGREGATE AND STABILIZER

[75] Inventors: Joseph Widener, Belvedere, S.C.; Russell M. Malone, Augusta, Ga.

[73] Assignee: The Babcock & Wilcox Company, New Orleans, La.

[21] Appl. No.: 701,842

[22] Filed: Feb. 14, 1985

[51] Int. Cl.$^4$ ................................................. C08J 9/00
[52] U.S. Cl. ........................................ 521/83; 106/87; 106/95
[58] Field of Search ..................... 106/87, 95; 521/83

[56] References Cited

U.S. PATENT DOCUMENTS

| | | | |
|---|---|---|---|
| 3,211,675 | 11/1965 | Johnson | 521/100 |
| 3,711,431 | 1/1973 | Vargiu et al. | 521/83 |
| 4,341,561 | 7/1982 | Britt et al. | 106/87 |
| 4,425,291 | 1/1984 | Beer et al. | 106/83 |

*Primary Examiner*—Maurice J. Welsh
*Attorney, Agent, or Firm*—James C. Simmons; Robert J. Edwards

[57] ABSTRACT

A foamed product for flowing over a distance of at least about 100 feet before setting and for providing increased strength and resiliency as well as high water resistance. The foamed product is produced from a mixture to which water is added to form a slurry, and a mineral acid and latex are added to the slurry. The mixture is of hydraulic cement, inert filler, aggregate, stabilizer, and latex. The latex is preferably a nonionic latex, and the hydraulic cement is preferably calcium aluminate cement.

24 Claims, No Drawings

WATER RESISTANT FOAMED PRODUCT PREPARED FROM A LATEX, A MINERAL ACID, HYDRAULIC CEMENT, FILLER, AGGREGATE AND STABILIZER

The present invention relates to a water resistant foamed product which may be used for insulating or re-insulating underground steam lines and the like.

It is a common scene in old murder mysteries on the late show to see whiffs of steam rising out of the manhole covers from deep within the bowels of the earth in large cities. Such a scene is representative of a substantial energy loss problem which many large cities experience. Hundreds of miles of steam lines are buried under the streets and criss-cross the larger cities. These steam lines may have been initially installed many years ago. In order to insulate them against heat loss, they were typically provided with perhaps a four inch thick block of calcium silicate refractory which is surrounded by a tubular member leaving perhaps a two inch dead air space between the refractory block and the tubular member. Over the years the tubular member may become corroded from the elements so that water is able to seep into this dead air space and eat through the refractory block so as to diminish its effectiveness to insulate, which loss of effectiveness is evident in the whiffs of steam rising from the manhole covers.

As the years pass, the effectiveness of the original insulation resultingly becomes less and less, and the heat losses become greater and greater. In many large cities, the losses are now becoming sufficiently great that it is becoming more urgent to renew the insulation. Conventionally, renewing the insulation would require digging or excavating the ground to the pipeline. However, such a process is very expensive since it is believed the excavation cost alone would be typically in the range of $1,000 to $1,500 or more per linear foot. In order to eliminate these huge excavation costs, it is desirable to be able to pump a water resistant insulating material along the dead air space for a distance of perhaps 130 feet in each direction from a single small hole dug in the ground to the steam line or from a point where a steam line passes through a manhole. It is then desirable that the insulating material harden after it has been flowed along the pipeline to thereby renew the insulation.

A foamed cellular refractory product produced from a dry mixture of hydraulic cement, fine grain inert filler, and an aggregate mixed with water, and with a mineral acid added to the resulting slurry mixture to induce chemical foaming, such as disclosed in U.S. Pat. No. 4,341,561 to Britt etal, while suitable for many applications, is not sufficiently suitable for field applications such as the reinsulating of underground steam lines as described above where ground water and moisture are present where it is desirable that the insulating product have lighter weight, higher strength, and especially water resistance. Moreover, a reduction in density of the Britt et al product typically results in lower strength.

A foamed waterglass cement to which a natural latex dispersion has been added, such as disclosed in U.S. Pat. No. 4,425,291 to Beer et al, releases water to bond and would therefore shrink upon air drying and result in gaps along the steam lines and therefore insufficiently insulate the steam lines. This problem may be solved by increasing the amount of mineral acid to prevent shrinkage. However, if too much mineral acid is added, outgassing and collapsing of the material may occur. Thus, in order for this product to be effective, it is required that very precise proportions of waterglass and mineral acid be provided to form the foamed material. This is of course difficult to control. In addition, there is a greater chance that the sodium, potassium, or lithium in waterglass cement will leach out and combine with chlorine found in river water and degrade the insulating material than if calcium were instead found in the insulating material.

Insulating material which is mechanically foamed cannot be controlled easily since it begins foaming as soon as foaming is induced and its foaming action may be lost before it has been pumped 100 feet or more as desired for underground steam lines.

It is therefore an object of the present invention to provide a refractory insulating material which is water resistant.

It is another object of the present invention to provide such a material which can be flowed over long distances such as 100 feet or more before bonding in order to insulate or reinsulate underground steam lines.

It is a further object of the present invention to provide such a material which has low density, high strength, and resiliency.

It is yet another object of the present invention to provide such a material which does not degrade easily when combined with chlorine from river water.

It is still another object of the present invention to provide such a material which is foamed and which will continue foaming as it is being pumped over long distances such as 100 feet.

It is yet another object of the present invention to provide such a material which is easy to formulate.

The various features of novelty which characterize the invention are pointed out with particularity in the claims annexed to and forming a part of this disclosure. For a better understanding of the invention, its operating advantages, and specific objects attained by its uses, reference is made to the following descriptive matter in which the preferred embodiments of the invention are illustrated.

DESCRIPTION OF THE PREFERRED EMBODIMENTS

In accordance with the present invention, there is provided a foamed product from a mixture consisting essentially by weight of between about 15 percent and about 95 percent cement, between 0 percent and about 85 percent inert filler, between 0 percent and about 85 percent aggregate, between 0 percent and about 20 percent stabilizer to which mixture water is added to form a slurry, latex is added to the slurry, and the slurry is foamed as described hereinafter.

As used in the present specification and in the claims, a "foamed" product is one in which porosity has been introduced into the product such as by the introduction of a gas generated by a chemical reaction. Such a foamed product may be characterized as cellular.

In order that the insulating material not contain elements such as sodium, potassium, or lithium which would easily combine with chlorine from ground water to degrade the product and in order to provide for easy formulation of the product when chemically foaming it, in accordance with the present invention, the cement used is an hydraulic cement such as calcium aluminate or calcium silicate cement. By "hydraulic" cement is meant a cement which hydrates when mixed with water to form a bond. This is in contrast to waterglass cement which releases water to bond thereby shrinking upon air drying to thereby result in gaps in the bonded material. Since both calcium and aluminate bond with the mineral acids used for the present invention, in order to provide increased strength to the final foamed product, it is preferred that the cement be a calcium aluminate cement such as Refcon, available from Lehigh Cement Company. A preferred amount of the cement is about 25 weight percent based on the total weight of the dry ingredients. In addition, a calcium aluminate cement is generally considered to have less contaminants than a calcium silicate cement.

About 22 percent by weight of inert fillers are preferably present in the dry mixture. These fillers are preferably fine grained, and may include, for example, a pyrophyllite filler such as RG-200 Pyrophyllite, sold by R. T. Vanderbilt Co., to act as a pore stabiizer, and a wollastonite such as Nyad 400 Wollastonite, supplied by Nyco Corporation, to provide low density in the final product.

About 48 percent by weight of an aggregate such as koalin calcine is preferably present in the dry mixture. The aggregate size is preferably sufficiently coarse so that the aggregate particles do not use too much water to dilute the foaming agent (described hereinafter) and such that the pot life may be increased and increased strength may be provided to the product. The aggregate size is preferably sufficiently fine so that the particles can be suspended in the slurry a sufficiently long time. Therefore, in order to provide increased strength, longer pot life, and the other qualities described above for the product, the preferred aggregate size ranges between about −20 mesh and about +325 mesh, and more preferably −150 mesh and +250 mesh. A suitable example of kaolin calcine for providing better flowability, less tendency to settle, and greater dispersion of the material throughout the mixture is 200M Mulcoa 47, sold by Combustion Engineering Company. Examples of other aggregates which may be used include, but are not limited to, trap rock, alumina, and silica sand.

A stabilizer such as, for example, anhydrous dibasic calcium phosphate is added to reduce settling, increase the pot life of the mixture, and act as a buffer in maintaining the pH of the mixture. In a preferred embodiment, the anhydrous dibasic calcium phosphate is present in an amount of about 5 percent by weight of the dry mixture.

Since water is a good heat conductor, it is desirable to keep water away from insulated steam lines. In order to form webs between the foamed cells in order to close the cells so that water cannot pass through the webs and thereby provide water-resistant properties to the final product as well as to provide increased resiliency to the final product in accordance with the present invention, latex is added in an amount preferably equal to between about 5 percent and about 50 percent (more preferably, in order to provide reduced costs to the product, about 5 percent) by weight of the dry mixture to the slurry mixture while continuously mixing. For example, if the dry mixture weighs 100 pounds, 5 pounds of latex, which is equal to 5 percent by weight of the dry mixture, may be added to the slurry. Since latex has a natural tendency to coagulate, a surfactant such as an organic salt or a salt of a fatty acid is added to the latex in order to disperse it. This results in the latex becoming ionic, i.e., its particles becoming positively or negatively charged. However, the surfactant itself may react with the foaming agent (hereinafter described) to cause coagulation and resulting clogging of the application nozzle used to carry the foaming material and thereby adversely affect flowability. Although anionic latexes may clog the application nozzles during pumping of the product along underground steam lines, in applications where quick setting is desirable, such as for spraying, such anionic latexes as 2671 Latex, produced by B. F. Goodrich Co., may be desirable. In order to remove the charges on the latex particles, they may be coated with a coating such as polyvinyl alcohol, paraffin wax, or other suitable inert coating to provide what is called herein a "nonionic" latex. By "nonionic" latex is thus meant a latex which has been treated to disperse and in which the particles thereof are not charged. In accordance with a preferred embodiment of the present invention, in order to reduce clogging of the nozzle carrying the foamed material, to provide increased flowability of the foamed material, and to inhibit settling during foaming of the material, the latex added to the mixture of the present invention is a nonionic latex such as, for example, 115 Neoprene Latex, sold by E. I. duPont deNemours and Co., or 26120 Latex, produced by B. F. Goodrich Co. A neoprene latex also exhibits a high temperature use limit when compared with, for example, acrylic latexes.

In accordance with the present invention, the dry mixture and latex are mixed with water to form a stable slurry with preferably about 55 to 70 percent solids content afterwhich it is foamed as hereinafter described. The latex dispersion is preferably added last to the slurry mixture while continuously mixing.

After the product has been pumped or otherwise placed in position where it is to be used, it is then allowed to set up. Since mechanical foaming begins immediately when the foaming is initiated and may not last long enough for the product to be pumped over a desired distance of perhaps 100 feet or more, in order to better control the foaming action so that there is a delayed reaction whereby the foaming may not begin until the material is being pumped and may last a longer period of time to allow pumping of the material over long distances, in accordance with a preferred embodiment of the present invention, a mineral acid such as, for example, phosphoric acid, sulfuric acid, hydrochloric acid, or hydrofluoric acid is added to the slurry to chemically foam it. If too much mineral acid is added to the slurry, outgassing which may cause the mixture to collapse may occur. On the other hand, if too little mineral acid is added to the slurry, the strength thereof is reduced and less foaming will occur resulting in a denser product. Therefore, in order to provide increased strength to the product and to prevent collapsing thereof during bonding, the mineral acid is preferably added to the slurry in a range of slurry to acid ratio of between about 2:1 to 7:1. Since phosphate bonds such as calcium phosphate or aluminum phosphate are more insoluble and thus are not as easily washed out and are more refractory and since phosphoric acid is considered safer to use, it is preferred that the mineral acid be phosphoric acid.

Referring to Table 1, there are shown several examples of foamed materials embodying the present invention, and test results showing the density, cold crushing strength (CCS), water absorption (which is a measure of water resistance), the set time, rise time, and volume increase. Values for density are shown in pounds per cubic foot taken at 150 degrees F. after the foamed material has set over night. The cold crushing strength (CCS) is given in pounds per square inch, likewise taken at 150 degrees F. after the product has set over night. Experimental values obtained before and after submersion and redrying are shown. The viscosity shown is that obtained where the mineral acid is mixed with the slurry mixture at the nozzle of the application apparatus used to apply the foamed material to the situs to be insulated. The percent of water absorption was determined after soaking of each sample in water for two days. The water absorption refers to the percent of original weight added.

Table 1 shows that the density of the final produce is in the range of about 22 to 55 pounds per cubic foot which is less than the density of the products of the Britt et al patent. It is normally expected by those of ordinary skill in the art to which this invention pertains that as the density is decreased, the cold crushing strength is also decreased. However, contrary to such expected results, the tests of Table 1 show generally an increased cold crushing strength (after submersion and redrying two days) to the range of 21 to 251 psi. This is generally greater than the cold crushing strength of typically 20 psi and usually no more than 30 psi of the products of the Britt et al patent. Although the reasons for this unexpected result are not definitely known, it is believed that the latex acts as an organic binder which substitutes for cement thus providing added strength as well as resiliency.

It is also noted, again unexpectedly, from Table 1 that as the amount of latex is increased from 25 percent to 30 percent, there is a very sharp increase in cold crushing strength to thus provide good shock absorbing capacity to the product.

TABLE I

PROPERTIES OF WATER RESISTANT INORGANIC FOAM

| *Dry Component A (Wt. %) | 1 | 2 | 3 | 4 | 5 | 6 | 7 | 8 | 9 | 10 |
|---|---|---|---|---|---|---|---|---|---|---|
| A. 200 M Mulcoa 47 | 48 | 48 | 48 | 48 | 48 | 48 | 48 | 48 | 57 | 57 |
| B. T-61 100 M Alumina | | | | | | | | | | |
| C. 100 M Silica Sand | | | | | | | | | | |
| D. −35 M Trap Rock | | | | | | | | | | |
| E. RG 200 Pyrophyllite | 13 | 13 | 13 | 13 | 13 | 13 | 13 | 13 | 13 | 13 |
| F. Nyad 400 Wollastonite | 9 | 9 | 9 | 9 | 9 | 9 | 9 | 9 | | |
| G. Anhydrous Dibasic Calcium Phosphate | 5 | 5 | 5 | 5 | 5 | 5 | 5 | 5 | 5 | 5 |
| H. 115 Neoprene Latex (47%) | +5 | +10 | +15 | +20 | +25 | +30 | +40 | +50 | +5 | +10 |
| I. −325 M. Calcium Carbonate | | | | | | | | | +.25 | +.25 |
| J. Refcon Cement | 25 | 25 | 25 | 25 | 25 | 25 | 25 | 25 | 25 | 25 |
| K. Density (PCF) @150° F./Overnight | 28 | 37 | 39 | 36 | 40 | 48 | 52 | 55 | 29 | 28 |
| L. CCS (psi) @150° F./Overnight Before Submersion | | | | | | 180 | 290 | 453 | 21 | 26 |
| M. CCS (psi) @150° F./Overnight After Submersion and redrying 2 days | 21 | 65 | 42 | 31 | 33 | 182 | 251 | 200 | 21 | 23 |
| N. Water Absorption @150° F./Overnight | 82 | 85 | 78 | 73 | 69 | 49 | 47 | 37 | 68 | 72 |
| O. Viscosity at Nozzle w/acid | Med | Med | Med | Med | Med | Med | Med | Med | Low | Low |
| P. Set Time (seconds) | 30–60 | 30–60 | 30–60 | 30–60 | 30–60 | 30–60 | 30–60 | 30–60 | 90–120 | 90–120 |
| Q. Rise Time (seconds) | 30–60 | 30–60 | 30–60 | 30–60 | 30–60 | 30–60 | 30–60 | 30–60 | 90–120 | 90–120 |
| R. Volume Increase | 150 | 150 | 125–150 | 125 | 125 | 125 | 125 | 125 | 150 | 150 |

| *Dry Component A (Wt. %) | 11 | 12 | 13 | 14 | 15 | 16 | 17 | 18 | 19 |
|---|---|---|---|---|---|---|---|---|---|
| A. 200 M Mulcoa 47 | 57 | 57 | 57 | 57 | 57 | 57 | | | |
| B. T-61 100 M Alumina | | | | | | | 57 | | |
| C. 100 M Silica Sand | | | | | | | | 57 | |
| D. −35 M Trap Rock | | | | | | | | 57 | |
| E. RG 200 Pyrophyllite | 13 | 13 | 13 | 13 | 13 | 13 | 13 | 13 | 13 |
| F. Nyad 400 Wollastonite | | | | | | | | | |
| G. Anhydrous Dibasic Calcium Phosphate | 5 | 5 | 5 | 5 | 5 | 5 | 5 | 5 | 5 |
| H. 115 Neoprene Latex (47%) | +15 | +20 | +25 | +30 | +40 | +50 | +5 | +5 | +5 |
| I. −325 M. Calcium Carbonate | +.25 | +.25 | +.25 | +.25 | +.25 | +.25 | +.25 | +.25 | +.25 |
| J. Refcon Cement | 25 | 25 | 25 | 25 | 25 | 25 | 25 | 25 | 25 |
| K. Density (PCF) | 29 | 35 | 33 | 48 | 50 | 55 | 34 | 36 | 22 |
| L. CCS (psi) @150° F./Overnight Before Submersion | 22 | 25 | 25 | 124 | 182 | 235 | 25 | 28 | 8 |
| M. CCS (psi) @150° F./Overnight After Submersion and redrying 2 days | 22 | 25 | 24 | 131 | 186 | 159 | 24 | 21 | 9 |
| N. Water Absorption @150° F./Overnight | 89 | 94 | 99 | 44 | 44 | 44 | 88 | 64 | 103 |
| O. Viscosity at Nozzle w/acid | Low | Low | Low | Low | Low | Low | Low | Low | Low |
| P. Set Time (seconds) | 90–120 | 90–120 | 90–120 | 90–120 | 90–120 | 90–120 | 90–120 | 90–120 | 90–120 |
| Q. Rise Time (seconds) | 90–120 | 90–120 | 90–120 | 90–120 | 90–120 | 90–120 | 90–120 | 90–120 | 90–120 |
| R. Volume Increase | 150 | 125 | 125 | 125 | 100 | 100 | 125 | 125 | 150 |

*Dry Component is mixed with water to form a stable slurry with 55–70% solids, then mixed with 75% phosphoric acid at a 4.5:1 (wt./wt.) slurry to acid.

In addition, the water absorption rate advantageously drops off substantially as the amount of latex is increased from 25 percent to 30 percent. Thus, in order to provide a low water absorption as well as good shock absorbing capacity to the product, it is preferred that latex be added in an amount equal to at least about 30 percent by weight of the dry mixture to the slurry mixture.

The test results as shown in Table 1 indicate that the water absorption (percent of original weight added) of a product embodying the present invention ranges between about 37 percent and 103 percent, which is substantially less than a typical water absorption rate of 128 percent for the product of the Britt et al patent and 400 percent for calcium silicate insulation. Although foamed borosilicate glass insulation may have a typical water absorption rate of 21 percent, foamed borosilicate glass insulations as well as calcium silicate insulations are rigid pre-formed insulating materials typically used in insulating and waterproofing applications which preformed insulations, unlike the new water-resistant inorganic foamed product embodying the present invention, may not be flowed into place before setting. As previously stated, the ability to flow the foamed product of the present invention into place before setting is advantageous for use in areas such as with "buried" steam lines where excavation would otherwise be required to reinsulate and waterproof the lines with such conventional materials as foamed borosilicate glass insulations.

While in accordance with the provisions of the statutes there is illustrated and described herein specific embodiments of the invention, those skilled in the art will understand that changes may be made in the form of the invention covered by the claims, and that certain features of the invention may sometimes be used to advantage without a corresponding use of the other features.

The embodiments of the invention in which an exclusive property or privilege is claimed are defined as follows:

1. A foamed product produced from a mixture to which water has been added to form a slurry and to which slurry a latex having a surfactant and a foaming agent have been added, said mixture consisting essentially by weight of between about 15 percent and about 95 percent hydraulic cement, between 0 percent and about 85 percent inert filler, between 0 percent and about 85 percent aggregate, and between 0 percent and about 20 percent stabilizer.

2. A foamed product according to claim 1 wherein the hydraulic cement is calcium aluminate cement.

3. A foamed product according to claim 1 wherein the inert filler includes pyrophyllite and wollastonite.

4. A foamed product according to claim 1 wherein the product is a cellular refractory product.

5. A foamed product according to claim 1 wherein the aggregate includes kaolin calcine.

6. A foamed product according to claim 1 wherein the aggregate size is between about −20 mesh and about +325 mesh.

7. A foamed product according to claim 1 wherein the stabilizer is anhydrous dibasic calcium phosphate.

8. A foamed product according to claim 1 wherein the water is present in the slurry after the addition of latex in an amount sufficient to provide a solids content of between about 55 percent and about 70 percent.

9. A foamed product according to claim 1 wherein the latex is a nonionic latex.

10. A foamed product according to claim 9 wherein the amount of latex added to the slurry is equal to at least about 30 percent by weight of the mixture.

11. A foamed product according to claim 1 wherein the foaming agent is phosphoric acid.

12. A foamed product according to claim 1 wherein the ratio by weight of the slurry, after the addition of the latex, to the foaming agent is between about 2:1 to about 7:1.

13. A foamed product according to claim 1 wherein the amount of latex added to the slurry is equal to between about 5 percent and about 50 percent by weight of the mixture.

14. A foamed product according to claim 1 wherein the amount of latex added to the slurry is equal to at least about 30 percent by weight of the mixture.

15. A foamed cellular refractory insulating water-resistant product which, before setting, may be flowed over a distance of at least 100 feet, the product is produced from a mixture to which water has been added to form a slurry and to which slurry a foaming agent and at least about 5 percent by weight of the mixture of nonionic latex has been added, said mixture consisting essentially by weight of between about 15 percent and about 95 percent calcium aluminate cement, between 0 percent and about 85 percent inert filler, between 0 percent and about 85 percent aggregate, and between 0 percent and about 20 percent stabilizer.

16. A foamed product according to claim 15 wherein the foaming agent is phosphoric acid, and the ratio by weight of the slurry, after the addition of the latex, to the mineral acid is between about 2:1 and about 7:1.

17. A foamed product according to claim 15 wherein the inert filler includes pyrophyllite and wollastonite.

18. A foamed product according to claim 15 wherein the stabilizer is anhydrous dibasic calcium phosphate.

19. A foamed product according to claim 15 wherein the water is present in the slurry, after the addition of the latex, in an amount sufficient to provide a solids content of between about 55 percent and about 70 percent.

20. A foamed product according to claim 15 wherein the aggregate size is between about −20 mesh and about +325 mesh.

21. A foamed product according to claim 15 wherein the mixture consists essentially by weight of about 25 percent calcium aluminate cement, about 22 percent inert filler, about 48 percent aggregate, and about 5 percent stabilizer, and the amount of latex is equal to about 5 percent by weight of the mixture.

22. A foamed product according to claim 21 wherein the inert filler consists essentially by weight of the dry mixture of about 13 percent pyrophyllite and about 9 percent wollastonite, the aggregate consists essentially of kaolin calcine, the water is present in the slurry, after the addition of latex, in an amount sufficient to provide a solids content of about 67 percent, and the foaming agent is phosphoric acid.

23. A foamed product according to claim 15 wherein the amount of latex added to the slurry is equal to at least about 30 percent by weight of the mixture.

24. A foamed product according to claim 1 wherein the foaming agent is a mineral acid.

* * * * *